(12) United States Patent
Zhao et al.

(10) Patent No.: US 11,247,909 B1
(45) Date of Patent: Feb. 15, 2022

(54) MULTI-GRAFTING SITE CARBON NANOMATERIAL AND ACTIVATED CARBON NANOMATERIAL AND PREPARATION METHOD THEREOF AND DISPLACEMENT SYSTEM FOR ULTRA-LOW PERMEABILITY OIL RESERVOIRS

(71) Applicants: China University of Petroleum (East China), Qingdao (CN); China University of Geosciences (Beijing), Beijing (CN)

(72) Inventors: Guang Zhao, Qingdao (CN); Caili Dai, Qingdao (CN); Lihao Liang, Qingdao (CN); Dongfang Lyu, Qingdao (CN); Qing You, Beijing (CN); Yifei Liu, Qingdao (CN); Ning Yang, Qingdao (CN); Ning Sun, Qingdao (CN)

(73) Assignees: CHINA UNIVERSITY OF PETROLEUM (EAST CHINA), Shandong (CN); CHINA UNIVERSITY OF GEOSCIENCES (BEIJING), Beijing (CN)

( * ) Notice: Subject to any disclaimer, the term of this patent is extended or adjusted under 35 U.S.C. 154(b) by 0 days.

(21) Appl. No.: 17/237,772

(22) Filed: Apr. 22, 2021

(30) Foreign Application Priority Data

Feb. 19, 2021  (CN) .......................... 202110195531.0

(51) Int. Cl.
*C01B 32/372* (2017.01)
*C01B 32/342* (2017.01)
*C09K 8/58* (2006.01)
*B82Y 40/00* (2011.01)

(52) U.S. Cl.
CPC .......... *C01B 32/372* (2017.08); *C01B 32/342* (2017.08); *C09K 8/58* (2013.01); *B82Y 40/00* (2013.01); *C01P 2004/62* (2013.01); *C01P 2004/64* (2013.01); *C09K 2208/10* (2013.01)

(58) Field of Classification Search
CPC ... C01B 32/372; C01B 32/342; C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C09K 8/58; C09K 2208/10; C01P 2004/64; C01P 2004/62; B82Y 40/00
See application file for complete search history.

(56) References Cited

U.S. PATENT DOCUMENTS

2011/0059871 A1* 3/2011 Tour ...................... B82Y 30/00
507/137
2015/0114646 A1* 4/2015 Price Hoelscher .... C09K 8/032
166/302

FOREIGN PATENT DOCUMENTS

CN            109042772 A    12/2018

* cited by examiner

*Primary Examiner* — Daniel C. McCracken
(74) *Attorney, Agent, or Firm* — Calfee, Halter & Griswold LLP

(57) ABSTRACT

The present disclosure discloses a multi-grafting site carbon nanomaterial comprising a structural unit represented by Formula (1), hydroxyl groups and a structural unit represented by Formula (2); wherein R is one or more selected from the group consisting of tolyl, diphenylmethyl, isophorone group and dicyclohexylmethyl;

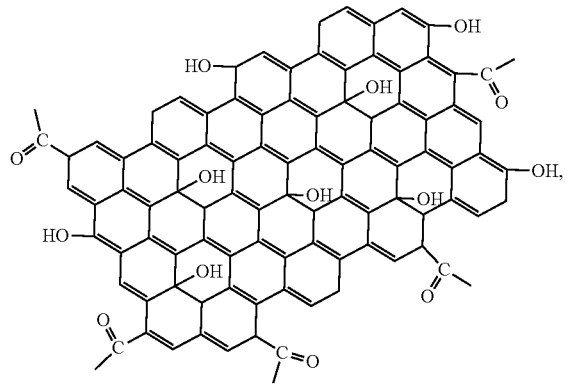

Formula (1)

Formula (2)

$$O{=}C{=}N{-}R{-}N{-}H.$$

19 Claims, 2 Drawing Sheets

US 11,247,909 B1

MULTI-GRAFTING SITE CARBON NANOMATERIAL AND ACTIVATED CARBON NANOMATERIAL AND PREPARATION METHOD THEREOF AND DISPLACEMENT SYSTEM FOR ULTRA-LOW PERMEABILITY OIL RESERVOIRS

CROSS REFERENCE TO RELATED APPLICATIONS

The application claims priority to Chinese Application No. 202110195531.0, filed on Feb. 19, 2021, entitled "a multi-grafting site carbon nanomaterial and activated carbon nanomaterial and preparation method thereof and displacement system for ultra-low permeability oil reservoirs", which is herein specifically and entirely incorporated by reference.

FIELD

The present disclosure pertains to the technical field of oilfield chemistry, and particularly relates to a multi-grafting site carbon nanomaterial and an activated carbon nanomaterial and a preparation method thereof, and a displacement system for ultra-low permeability oil reservoirs.

BACKGROUND

The demand of petroleum resources has been continuously increasing due to the rapid growth of national economy in China. Therefore, strengthening efforts in the exploration of oil and gas resources and improving exploitation efficiency of the existing blocks are one of the most effective routes for China to save petroleum resources from the root. At present, the proportion of crude oil in ultra-low permeability oil reservoirs in the newly-explored reserves in China is obviously increased, but the oil reservoirs have a low mobilization degree.

The fracturing technology is an important technology for improving development of the ultra-low permeability oil reservoirs. By means of the fracturing transformation, a large number of micron grade or nano-scale artificial cracks are formed in the ultra-low permeability oil reservoir stratum, the flow conductivity of the reservoir stratum is enhanced. The generation of the artificial fracture compensates the defect of low permeability of the matrix, but the heterogeneity of the reservoir stratum will be intensified. In addition, the heterogeneity of the reservoir stratum is further exacerbated by the development of natural micro-fractures in the ultra-low permeability oil reservoir stratum. During the water injection development process, because the permeability of the fractures is far greater than that of the matrix, the injected water is prone to flow along the micro-fractures, so that the main fractures participating in seepage are completely or mostly filled with water, while the secondary fractures and the matrix system are still in a high oil bearing saturation area, thus the water injection development effect is poor, the water flooding recovery rate of the oil reservoir is low. As a result, the high-efficiency exploitation of the ultra-low permeability oil reservoir is the focus of the oil reservoir exploitation at present.

The existing displacement system used for the ultra-low permeability oil reservoirs mainly comprises surfactants, polymers, polymer microspheres, nano silica and the like.

However, the ultra-low permeability oil reservoir has poor physical properties and serious heterogeneity of the reservoir stratum, the injected surfactant is prone to flow along the fracture system, so that the oil displacement effect of the surfactant is reduced; in addition, the ultra-low permeability oil reservoir has the problem of high-pressure and insufficient injection, and the polymer displacement system has high viscosity and is difficult to inject into the reservoir stratum effectively. In order to solve the problem, the nano-scale and micron-grade polymer microspheres have been developed and widely applied in the ultra-low permeability oil reservoirs, and achieved the remarkable effects of increasing oil yield and reducing water injection. However, the polymer microspheres are prepared by using an acrylamide monomer as the raw material, which has poor performance in the environmental protection and deteriorated stability after expansion in the stratum, and cannot ensure the long-term and efficient effect of oil displacement. In recent years, the developed nano-silica oil displacement system has started an application in the ultra-low permeability oil reservoirs due to its small size and the interfacial activity effect. However, the nano-silica oil displacement system relates to rigid particles, which are influenced by physicochemical properties of the stratum and long-term erosion of the stratum water, the surface property of the nano-particle is changed, so that the stability is undesirable. In addition, the nano-silica particles have a high density, such that a gravity difference effect may be formed, the oil displacement effect of the particles gets worse.

Therefore, the development of an activated carbon nanomaterial for oil displacement of the ultra-low permeability oil reservoirs has an important significance.

SUMMARY

The present disclosure aims to overcome the defect in the prior art concerning the poor effect of a displacement system used for ultra-low permeability oil reservoirs, and provides a multi-grafting site carbon nanomaterial and an activated carbon nanomaterial and a preparation method thereof, and a displacement system for the ultra-low permeability oil reservoirs. The displacement system for ultra-low permeability oil reservoirs has high interfacial activity, the oil-water interfacial tension is reduced by $10^{-2}$ mN/m order of magnitude, and the oil washing efficiency can be remarkably improved.

In order to fulfill the above purpose, a first aspect of the present disclosure provides a multi-grafting site carbon nanomaterial comprising a structural unit represented by Formula (1), hydroxyl groups and a structural unit represented by Formula (2);

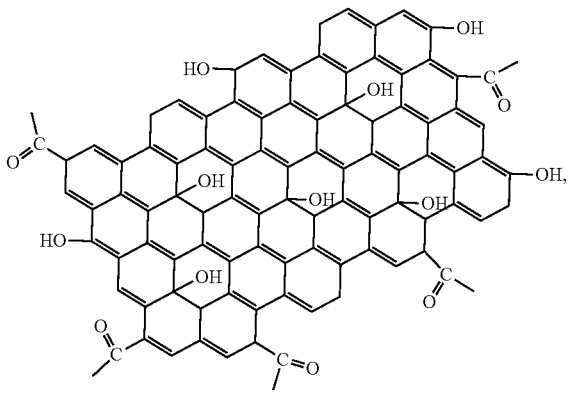

Formula (1);

$$O=C=N-R-N-H,\quad \text{Formula (2)};$$

wherein R is one or more selected from the group consisting of tolyl, diphenylmethyl, isophorone group and dicyclohexylmethyl.

A second aspect of the present disclosure provides a method for preparing the aforementioned multi-grafting site carbon nanomaterial including:

($F_1$) dispersing an oxidized carbon nanomaterial in a first organic solvent to obtain a dispersion liquid;

($F_2$) contacting the dispersion liquid with a grafting agent to carry out a grafting reaction;

($F_3$) subjecting the solution obtained after the step ($F_2$) to a centrifugation, rotary steaming and grinding treatment to prepare the multi-grafting site carbon nanomaterial;

wherein the oxidized carbon nanomaterial has a structure represented by Formula (3):

Formula (3);

wherein the grafting agent is one or more selected from the group consisting of toluene diisocyanate, diphenylmethane diisocyanate, isophorone diisocyanate and dicyclohexylmethane diisocyanate.

A third aspect of the present disclosure provides a method for preparing an activated carbon nanomaterial including:

($F_4$) dispersing the aforementioned multi-grafting site carbon nanomaterial in a second organic solvent to obtain a dispersion liquid;

($F_5$) contacting the dispersion liquid with an active agent in the presence of a catalyst to carry out an activation reaction;

($F_6$) subjecting the solution obtained after the step ($F_5$) to a centrifugation, washing, rotary steaming and grinding treatment to prepare an activated carbon nanomaterial;

wherein the active agent has a structure represented by Formula (4):

$$R''-\overset{CH_3}{\underset{CH_3}{\overset{|+}{N}}}-CH_2\overset{}{\underset{OH}{CH}}CH_2SO_3^-,$$

Formula (4);

wherein R'' is one or more selected from the group consisting of dodecyl, tetradecyl, hexadecyl and octadecyl.

A fourth aspect of the present disclosure provides an activated carbon nanomaterial prepared with the aforementioned method.

A fifth aspect of the present disclosure provides a displacement system for ultra-low permeability oil reservoirs comprising the activated carbon nanomaterial prepared with the aforementioned method.

Through the technical scheme, the present disclosure has the following advantages:

(1) The displacement system for the ultra-low permeability oil reservoirs in the present disclosure takes the activated carbon nanomaterial as the matrix, which has the average particle size of 70-200 nm, and the characteristics of soft body, self-lubrication and stable physical and chemical properties in the oil reservoirs, and can realize the objects of the ultra-low permeability oil reservoirs, namely "the displacement system can be injected into the oil reservoir, flow a long route, and mobilize the oil reservoir".

(2) The displacement system for ultra-low permeability oil reservoirs in the present application has high interfacial activity, the oil-water interfacial tension is reduced by $10^{-2}$ mN/m order of magnitude, and the oil washing efficiency can be remarkably improved; the nanometer size effect can regulate and control ultra-low permeability microcracks and improve the matrix mobilization capability.

(3) The displacement system for ultra-low permeability oil reservoirs in the present application has a characteristic that it is dispersed upon dissolving in water, it can be easily prepared, thus has the features of simple on-site operation and flexible construction process.

(4) The displacement system for ultra-low permeability oil reservoirs in the present application has the advantages such as simple preparation method and easily available raw materials, which facilitate contribution the product promotion.

DESCRIPTION OF SYMBOLS

Figure 1:
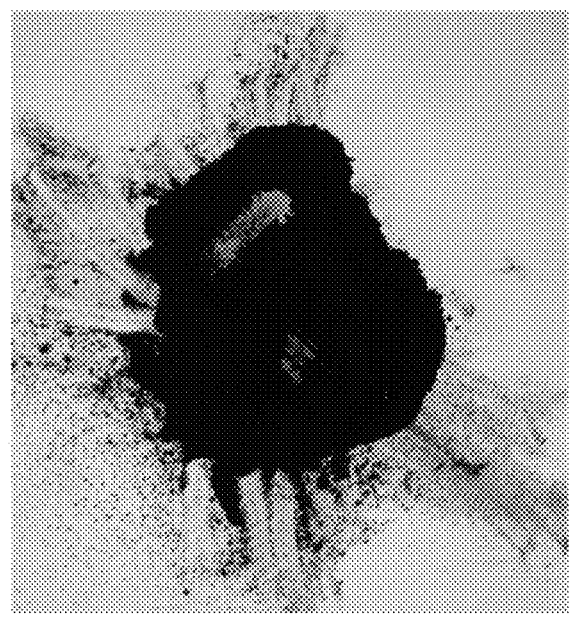
FIG. 1 illustrates a macroscopic topography diagram of a multi-grafting site carbon nanomaterial prepared in Example 4 of the present disclosure.

"1"—Unmodified carbon nanomaterial; "2"—Activated carbon nanomaterial.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In order to fulfill the above purpose, a first aspect of the present disclosure provides a multi-grafting site carbon nanomaterial comprising a structural unit represented by Formula (1), hydroxyl groups and a structural unit represented by Formula (2);

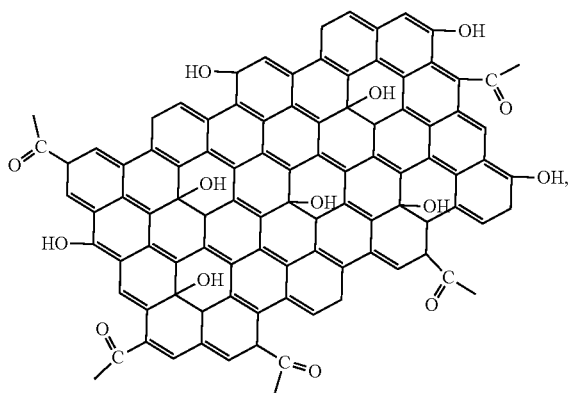

Formula (1);

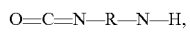 Formula (2);

wherein R is one or more selected from the group consisting of tolyl, diphenylmethyl, isophorone group and dicyclohexylmethyl.

The inventors of the present disclosure have surprisingly discovered that the activated carbon nanomaterial represented by Formula (5) is applied in the ultra-low permeability oil reservoirs, and the mobilization capability of residual oil in the ultra-low permeability oil reservoirs can be significantly improved by taking advantage of the characteristics of the activated carbon nanomaterial, namely soft body self-lubrication, low interfacial tension, wettability modification capability, separation pressure effect, efficient oil washing and micro regulation of the oil reservoirs. However, when the activated carbon nanomaterial is prepared by esterification of an oxidized carbon nanomaterial with an active agent, since the carboxyl group on the surface of the oxidized carbon nanomaterial has low reactivity, it is difficult to directly prepare the activated carbon nanomaterial, thus it is necessary to further convert the carboxyl group on the surface of the oxidized carbon nanomaterial into a group having a high reactivity. Therefore, the inventors of the present disclosure envisage a solution of initially contacting the oxidized carbon nanomaterial with a grafting agent to carry out a grafting reaction, so that at least a part of the oxidized carbon nanomaterial is grafted with a structural unit expressed by Formula (2), $CO_2$ is released, and the multi-grafting site carbon nanomaterial is obtained; subsequently contacting the multi-grafting site carbon nanomaterial with an active agent to perform reaction, the surface of the multi-grafting site carbon nanomaterial is provided with isocyanate groups obtained from conversion of carboxyl, the isocyanate groups have high reaction activity and can react with hydroxyl groups on the active agent to prepare the activated carbon nanomaterial.

According to the present disclosure, the multi-grafting site carbon nanomaterial comprises a structural unit represented by Formula (1), hydroxyl groups and a structural unit represented by Formula (2); that is, an acyl side chain of the structural unit represented by Formula (1) is grafted with a hydroxyl group and/or the structural unit represented by Formula (2), and the grafting ratio of the structural unit represented by Formula (2) is within a range of 20-100%, based on the total content of the acyl side chains of the structural unit represented by Formula (1). In other words, at least 20% of the acyl side chains in the structural unit represented by Formula (1) are grafted with the structural unit represented by Formula (2), and the acyl side chain of the structural unit represented by Formula (1) which is not grafted with the structural unit represented by Formula (2) is bonded with the hydroxyl group.

According to the present disclosure, it is preferable that the content of the structural unit represented by the Formula (2) is 20-100% relative to the content of the acyl side chains; that is, 20-100% of the acyl sites in the structural unit represented by Formula (1) are grafted with the structural unit represented by Formula (2).

According to the present disclosure, more preferably, the multi-grafting site carbon nanomaterial comprises a structural unit represented by Formula (1) and a structural unit represented by Formula (2); that is, all of the acyl sites in the structural unit represented by Formula (1) are grafted with the structural unit represented by Formula (2).

According to the present disclosure, the average particle size of the multi-grafting site carbon nanomaterial is 81-170 nm, preferably 83-189 nm.

A second aspect of the present disclosure provides a method for preparing the aforementioned multi-grafting site carbon nanomaterial including:

($F_1$) dispersing an oxidized carbon nanomaterial in a first organic solvent to obtain a dispersion liquid;

($F_2$) contacting the dispersion liquid with a grafting agent to carry out a grafting reaction;

($F_3$) subjecting the solution obtained after the step ($F_2$) to a centrifugation, rotary steaming and grinding treatment to prepare the multi-grafting site carbon nanomaterial;

wherein the oxidized carbon nanomaterial has a structure represented by Formula (3):

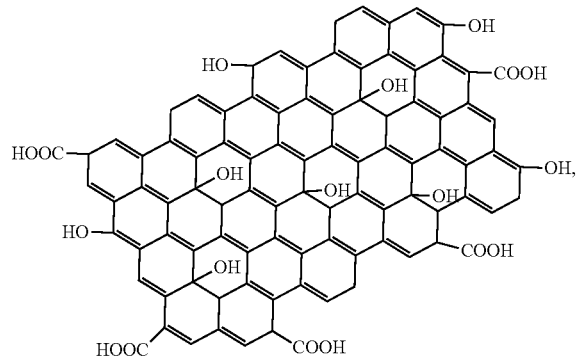

Formula (3);

wherein the grafting agent is one or more selected from the group consisting of toluene diisocyanate, diphenylmethane diisocyanate, isophorone diisocyanate and dicyclohexylmethane diisocyanate.

According to the present disclosure, the grafting agent is preferably diphenylmethane diisocyanate.

According to the present disclosure, the first organic solvent is one or more selected from the group consisting of toluene, xylene and dichloromethane, preferably toluene.

According to the present disclosure, the average particle size of the oxidized carbon nanomaterial is 50-200 nm, preferably 80-150 nm, more preferably 120-140 nm.

According to the present disclosure, the oxidized carbon nanomaterial is dispersed in the first organic solvent in the step ($F_1$) in order to sufficiently disperse the oxidized carbon nanomaterial and prevent a side reaction of a grafting agent which is added subsequently; in addition, the conditions for the dispersion comprise: the stirring speed is 200-1,000 rpm, the temperature is 10-30° C., and the time is 5-30 min;

preferably, the stirring speed is 400-600 rpm, the temperature is 15-25° C., and the time is 10-20 min.

According to the present disclosure, in step (F2), the conditions of grafting reaction in step (F₂) comprise: the stirring speed is 200-1,000 rpm, the reaction temperature is 60-100° C., and the reaction time is 1-10 h; preferably, the stirring speed is 400-600 rpm, the reaction temperature is 70-90° C., and the reaction time is 3-5 h. In the present disclosure, the contact conditions are limited within the above ranges, there are the advantages that the oxidized carbon nanomaterial can sufficiently react with the grafting agent, and the reaction process is not excessively violent on the condition that the reaction efficiency is ensured.

According to the present disclosure, in step (F₁), the weight ratio of the amount of the oxidized carbon nanomaterial to the first organic solvent is (6-20): 100, preferably (9-16): 100.

According to the present disclosure, the weight ratio of the amount of the grafting agent to the first organic solvent is (0.6-2): 100, preferably (0.8-1.2): 100.

The present disclosure defines the mass ratio of the amounts of the oxidized carbon nanomaterial, the grafting agent and the first organic solvent within the aforementioned ranges, the advantages reside in that the reaction agent can be sufficiently dispersed in the solvent, and the carboxyl group on the surface of the oxidized carbon nanomaterial can be sufficiently activated to the isocyanate group.

According to the present disclosure, the conditions of the centrifugation comprise: performing centrifugation at the rotation speed of 5,000-20,000 rpm for 5-17 h, preferably performing centrifugation at the rotation speed of 8,000-12,000 rpm for 8-14 h.

According to the present disclosure, the conditions of the rotary steaming comprise: rotary steaming at 50-95° C. for 3-8 h, preferably rotary steaming at 60-80° C. for 5-7 h.

According to the present disclosure, the conditions of the grinding comprise: grinding for 3-8 times, each grinding is performed for 7-15 min, preferably grinding for 4-6 times, and each grinding is performed for 9-12 min.

According to a preferred embodiment of the present disclosure, the method for preparing the multi-grafting site carbon nanomaterial including:

adding the oxidized carbon nanomaterial (with a particle size of 120-140 nm) into toluene at room temperature (20±5° C.), and stirring under the conditions consisting of a stirring speed of 400-600 rpm for 10-20 min; adding a grafting agent while stirring, and continuously stirring for 3-5 h at the oil bath temperature of 70-90° C. to obtain a multi-grafting site carbon nanomaterial solution; the obtained solution is subjected to centrifuging, rotary steaming, grinding and dispersing to prepare the multi-grafting site carbon nanomaterial.

A third aspect of the present disclosure provides a method for preparing an activated carbon nanomaterial including:

(F₄) dispersing the aforementioned multi-grafting site carbon nanomaterial in a second organic solvent to obtain a dispersion liquid;

(F₅) contacting the dispersion liquid with an active agent in the presence of a catalyst to carry out an activation reaction;

(F₆) subjecting the solution obtained after the step (F₅) to a centrifugation, washing, rotary steaming and grinding treatment to prepare an activated carbon nanomaterial;

wherein the active agent has a structure represented by Formula (4):

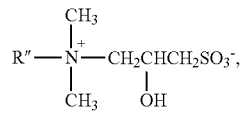

Formula (4);

wherein R" is one or more selected from the group consisting of dodecyl, tetradecyl, hexadecyl and octadecyl.

According to the present disclosure, the active agent is one or more of dodecyl hydroxypropyl sulfobetaine, tetradecyl hydroxypropyl sulfobetaine, hexadecyl hydroxypropyl sulfobetaine and octadecyl hydroxypropyl sulfobetaine; preferably, the active agent is tetradecyl hydroxypropyl sulfobetaine and/or hexadecyl hydroxypropyl sulfobetaine.

According to the present disclosure, the conditions of dispersion in step (F₄) comprise: the stirring speed is 200-1,000 rpm, the temperature is 10-30° C., and the time is 5-30 min; preferably, the stirring speed is 400-600 rpm, the temperature is 15-25° C., and the time is 10-20 min.

According to the present disclosure, the conditions of the activation reaction in step (F5) comprise: the stirring speed is 200-1,000 rpm, the reaction temperature is 25-80° C., and the reaction time is 1-6 h; preferably, the stirring speed is 400-600 rpm, the reaction temperature is 40-55° C., and the reaction time is 2-4 h.

According to the present disclosure, the weight ratio of the amount of the multi-grafting site carbon nanomaterial to the second organic solvent is (8-22): 100, preferably (10-18): 100.

According to the present disclosure, the weight ratio of the amount of the active agent to the second organic solvent is (4-20): 100, preferably (11-15): 100.

According to the present disclosure, the weight ratio of the amount of the catalyst to the second organic solvent is (0.01-0.5): 100, preferably (0.03-0.04): 100.

According to the present disclosure, the catalyst is one or more selected from the group consisting of dibutyltin dilaurate, stannous octoate and dibutyltin maleate, and preferably dibutyltin dilaurate.

According to the present disclosure, the second organic solvent is one or more selected from the group consisting of toluene, xylene and dichloromethane, preferably toluene.

According to the present disclosure, the conditions of centrifugation comprise: performing centrifugation at the rotation speed of 6,000-25,000 rpm for 6-18 h, preferably performing centrifugation at the rotation speed of 10,000-12,000 rpm for 10-14 h.

According to the present disclosure, the conditions of washing comprise: washing with deionized water for 2-5 times, each washing is performed for 3-6 min, preferably: washing with deionized water for 3-4 times, each washing is performed for 4-5 min.

According to the present disclosure, the conditions of drying comprise: rotary steaming at 70-95° C. for 3-8 h, preferably rotary steaming at 80-90° C. for 4-7 h.

According to the present disclosure, the conditions of the grinding comprise: grinding for 3-8 times, each grinding is performed for 10-20 min, preferably grinding for 5-7 times, and each grinding is performed for 12-17 min.

According to a preferred embodiment of the present disclosure, the method for preparing the activated carbon nanomaterial including:

Initially adding the multi-grafting site carbon nanomaterial into toluene at room temperature (20±5° C.), and stirring under the conditions consisting of a stirring speed of 400-600 rpm for 10-20 min; adding an active agent while stirring, further adding a catalyst, and stirring at 40-55° C. for 2-4 h to obtain an activated carbon nanomaterial dispersion solution; subjecting the obtained dispersion solution to centrifuging, washing, rotary steaming, grinding and dispersing to prepare the activated carbon nanomaterial.

A fourth aspect of the present disclosure provides an activated carbon nanomaterial prepared with the aforementioned method.

According to the present disclosure, the activated carbon nanomaterial has a structure represented by Formula (5):

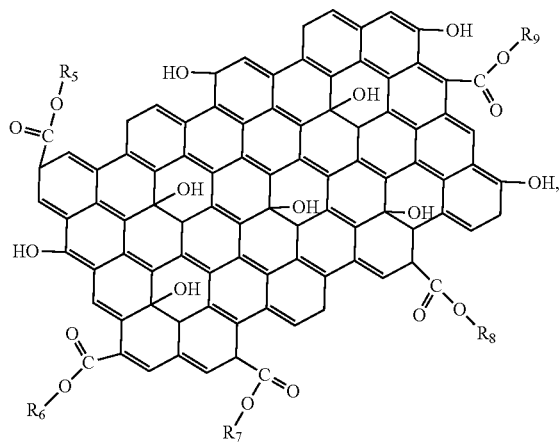

Formula (5);

wherein $R_5$, $R_6$, $R_7$, $R_8$ and $R_9$ are the same or different, each is H or a structural unit represented by Formula (6), and the proportion of the structural unit represented by Formula (6) is 20-100%, based on the total content of the numbers of $R_5$, $R_6$, $R_7$, $R_8$ and $R_9$ at the ester group side chains of the structure represented by Formula (5);

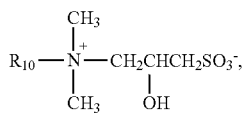

Formula (6);

wherein, $R_{10}$ is one or more selected from the group consisting of dodecyl, tetradecyl, hexadecyl and octadecyl.

According to the present disclosure, the activated carbon nanomaterial has an average particle size of 70-200 nm, preferably 80-195 nm.

A fifth aspect of the present disclosure provides a displacement system for ultra-low permeability oil reservoirs comprising the aforementioned activated carbon nanomaterial.

According to the present disclosure, the displacement system further comprises water. In the present disclosure, it is preferable that the content of the activated carbon nanomaterial is 0.05-0.25 wt % and the content of the water is 99.75-99.95 wt % based on the total weight of the displacement system.

According to the present disclosure, the water is deionized water.

According to the present disclosure, the ultra-low permeability oil reservoir has a permeability of 0.5-10 mD, there is micro-fracture development, and the simulated oil reservoir temperature is 90° C.

The present disclosure will be described in detail below with reference to examples.

In the following examples and comparative examples:

The image parameters of the high-magnification transmission electron microscope (TEM) were measured with a high-speed photomicrograph system having a model name JEM-2100 purchased from the Japan Electron Optics Laboratory (JEOL) Ltd. in Japan.

The Fourier infrared curve chart was measured by an infrared spectrometer with a model number VERTEX70 purchased from Bruker Company in Germany.

Each of the oxidized carbon nanomaterial, toluene, xylene, methylene chloride, diphenylmethane diisocyanate, isophorone diisocyanate, dibutyltin dilaurate, stannous octoate, dibutyl tin maleate is commercially available from the Macklin Company; each of dodecyl hydroxypropyl sulfobetaine, tetradecyl hydroxypropyl sulfobetaine and hexadecyl hydroxypropyl sulfobetaine is commercially available from Shanghai Promise Song Industrial Co., Ltd.

Example 1

The example served to illustrate a multi-grafting site carbon nanomaterial prepared with the method of the present disclosure.

($F_1$) 13.26 g of oxidized carbon nanomaterial with a particle size of 140 nm was initially added into 86 g of toluene at room temperature (15° C.), the mixture was subjected to stirring under the conditions consisting of the stirring speed of 400 rpm for 10 min;

($F_2$) 0.74 g of toluene diisocyanate was added while stirring, the mixture was subjected to continuously stirring at the oil bath temperature of 70° C. for 3 h to obtain a multi-grafting site carbon nanomaterial solution;

($F_3$) the obtained solution was subjected to a centrifugation at a rotary speed of 8,000 rpm for 8 h, and rotary steaming at 60° C. for 5 h, and grinding and dispersing for 4 times, each grinding was performed for 9 min.

As a result, a multi-grafting site carbon nanomaterial having a particle size of 116 nm was prepared, the multi-grafting site carbon nanomaterial comprised a structural unit represented by Formula (1), hydroxyl groups, and a structural unit represented by Formula (2), wherein 60% of acyl side chains were connected with the hydroxyl groups, and 40% of acyl side chains were connected with the structural unit represented by Formula (2), wherein the group R was a tolyl.

Example 2

The example served to illustrate a multi-grafting site carbon nanomaterial prepared with the method of the present disclosure.

($F_1$) 12 g of oxidized carbon nanomaterial with a particle size of 135 nm was initially added into 87.2 g of toluene at room temperature (20° C.), the mixture was subjected to stirring under the conditions consisting of the stirring speed of 450 rpm for 13 min;

($F_2$) 0.8 g of diphenylmethane diisocyanate was added while stirring, the mixture was subjected to continuously stirring at the oil bath temperature of 75° C. for 4 h to obtain a multi-grafting site carbon nanomaterial solution;

($F_3$) the obtained solution was subjected to a centrifugation at a rotary speed of 10,000 rpm for 12 h, and rotary steaming at 65° C. for 6 h, and grinding and dispersing for 5 times, each grinding was performed for 10 min.

As a result, a multi-grafting site carbon nanomaterial having a particle size of 107 nm was prepared, the multi-grafting site carbon nanomaterial comprised a structural unit represented by Formula (1), hydroxyl groups, and a structural unit represented by Formula (2), wherein 40% of acyl side chains were connected with the hydroxyl groups, and 60% of acyl side chains were connected with the structural unit represented by Formula (2), wherein the Group R was a diphenylmethyl.

Example 3

The example served to illustrate a multi-grafting site carbon nanomaterial prepared with the method of the present disclosure.

($F_1$) 11 g of oxidized carbon nanomaterial with a particle size of 120 nm was initially added into 88.1 g of toluene at room temperature (20° C.), the mixture was subjected to stirring under the conditions consisting of the stirring speed of 500 rpm for 15 min;

($F_2$) 0.9 g of diphenylmethane diisocyanate was added while stirring, the mixture was subjected to continuously stirring at the oil bath temperature of 80° C. for 4.5 h to obtain a multi-grafting site carbon nanomaterial solution;

($F_3$) the obtained solution was subjected to a centrifugation at a rotary speed of 11,000 rpm for 13 h, and rotary steaming at 70° C. for 7 h, and grinding and dispersing for 5 times, each grinding was performed for 11 min.

As a result, a multi-grafting site carbon nanomaterial having a particle size of 95 nm was prepared, the multi-grafting site carbon nanomaterial comprised a structural unit represented by Formula (1), hydroxyl groups, and a structural unit represented by Formula (2), wherein 20% of acyl side chains were connected with the hydroxyl groups, and 80% of acyl side chains were connected with the structural unit represented by Formula (2), wherein the group R was a diphenylmethyl.

Example 4

The example served to illustrate a multi-grafting site carbon nanomaterial prepared with the method of the present disclosure.

($F_1$) 10.1 g of oxidized carbon nanomaterial with a particle size of 120 nm was initially added into 88.7 g of toluene at room temperature (25° C.), the mixture was subjected to stirring under the conditions consisting of the stirring speed of 600 rpm for 10 min;

($F_2$) 1.2 g of diphenylmethane diisocyanate was added while stirring, the mixture was subjected to continuously stirring at the oil bath temperature of 90° C. for 5 h to obtain a multi-grafting site carbon nanomaterial solution;

($F_3$) the obtained solution was subjected to a centrifugation at a rotary speed of 12,000 rpm for 14 h, and rotary steaming at 80° C. for 7 h, and grinding and dispersing for 6 times, each grinding was performed for 12 min.

As a result, a multi-grafting site carbon nanomaterial having a particle size of 83 nm was prepared, the multi-grafting site carbon nanomaterial comprised a structural unit represented by Formula (1) and a structural unit represented by Formula (2), wherein all the acyl side chains were connected with the structural unit represented by Formula (2), wherein the group R was a diphenylmethyl. In addition, FIG. 1 illustrated a macroscopic topography diagram of the multi-grafting site carbon nanomaterial prepared in Example 4, it was shown in FIG. 1 that the multi-grafting site carbon nanomaterial had uniform particles, which were conducive to the subsequent modification reaction.

Example 5

The example served to illustrate a multi-grafting site carbon nanomaterial prepared with the method of the present disclosure.

($F_1$) 14 g of oxidized carbon nanomaterial with a particle size of 140 nm was initially added into 85.3 g of toluene at room temperature (15° C.), the mixture was subjected to stirring under the conditions consisting of the stirring speed of 300 rpm for 8 min;

($F_2$) 0.7 g of isophorone diisocyanate was added while stirring, the mixture was subjected to continuously stirring at the oil bath temperature of 60° C. for 2 h to obtain a multi-grafting site carbon nanomaterial solution;

($F_3$) the obtained solution was subjected to a centrifugation at a rotary speed of 7,000 rpm for 6 h, and rotary steaming at 60° C. for 4 h, and grinding and dispersing for 3 times, each grinding was performed for 7 min.

As a result, a multi-grafting site carbon nanomaterial having a particle size of 219 nm was prepared, the multi-grafting site carbon nanomaterial comprised a structural unit represented by Formula (1), hydroxyl groups, and a structural unit represented by Formula (2), wherein 80% of acyl side chains were connected with the hydroxyl groups, and 20% of acyl side chains were connected with the structural unit represented by Formula (2), wherein the group R was an isophorone group.

Example 6

The example served to illustrate a multi-grafting site carbon nanomaterial prepared with the method of the present disclosure.

($F_1$) 13 g of oxidized carbon nanomaterial with a particle size of 150 nm was initially added into 86.2 g of toluene at room temperature (20° C.), the mixture was subjected to stirring under the conditions consisting of the stirring speed of 400 rpm for 10 min;

($F_2$) 0.8 g of dicyclohexylmethane diisocyanate was added while stirring, the mixture was subjected to continuously stirring at the oil bath temperature of 70° C. for 3 h to obtain a multi-grafting site carbon nanomaterial solution;

($F_3$) the obtained solution was subjected to a centrifugation at a rotary speed of 10,000 rpm for 8 h, and rotary steaming at 70° C. for 5 h, and grinding and dispersing for 4 times, each grinding was performed for 10 min.

As a result, a multi-grafting site carbon nanomaterial having a particle size of 186 nm was prepared, the multi-grafting site carbon nanomaterial comprised a structural unit represented by Formula (1), hydroxyl groups, and a structural unit represented by Formula (2), wherein 80% of acyl side chains were connected with the hydroxyl groups, and 20% of acyl side chains were connected with the structural unit represented by Formula (2), wherein the group R was a dicyclohexylmethane group.

Example 7

The example served to illustrate an activated carbon nanomaterial prepared with the method of the present disclosure.

(F₄) 8 g of the multi-grafting site carbon nanomaterial (with a particle size of 116 nm) obtained in Example 1 was initially added into 81.7 g of toluene at room temperature (15° C.), the mixture was subjected to stirring under the conditions consisting of the stirring speed of 450 rpm for 10 min;

(F₅) 5 g of tetradecyl hydroxypropyl sulfobetaine and 5 g of hexadecyl hydroxypropyl sulfobetaine were added while stirring, 0.3 g of catalyst dibutyltin dilaurate was further added, the mixture was subjected to stirring at 40° C. for 2 h to obtain a dispersion solution of active carbon nanomaterial for ultra-low permeability oil reservoirs.

(F₆) the obtained solution was subjected to washing with deionized water in sequence for 3 times, each washing was performed for 4 min; the solution was subsequently subjected to a centrifugation at a rotary speed of 10,000 rpm for 10 h; and rotary steaming at 80° C. for 4 h, and grinding and dispersing for 5 times, each grinding was performed for 12 min.

As a result, the activated carbon nanomaterial for ultra-low permeability oil reservoirs was prepared, which had a structural unit expressed by Formula (5), wherein 60% of groups $R_5$-$R_9$ was H, and 40% of $R_5$-$R_9$ was structural unit expressed by Formula (6); in addition, the structural units represented by Formula (6) comprised two types: a type of group $R_{10}$ was tetradecyl, another type of group $R_{10}$ was hexadecyl.

Moreover, the activated carbon nanomaterial and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was $5.37 \times 10^{-2}$ mN/m.

Figure 2:
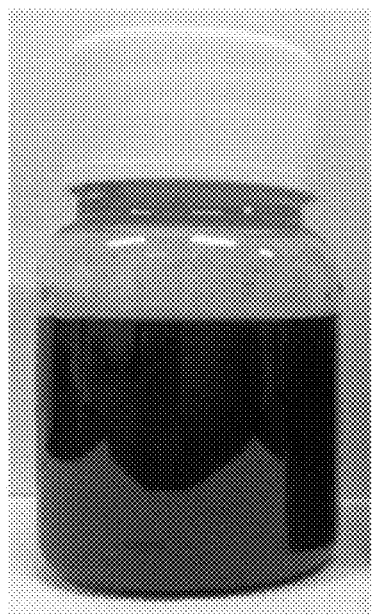
FIG. 2 illustrates a macroscopic topography diagram of the displacement system for ultra-low permeability oil reservoirs prepared in Example 7 of the present disclosure.

FIG. 2 illustrated a macroscopic topography diagram of the displacement system of activated carbon nanomaterial for ultra-low permeability oil reservoirs, as shown in FIG. 2, the activated carbon nanomaterial for ultra-low permeability oil reservoirs can be uniformly dispersed in an aqueous solution, there was not an agglomeration phenomenon, and can form a uniform displacement system of activated carbon nanomaterial for ultra-low permeability oil reservoirs.

Figure 3:
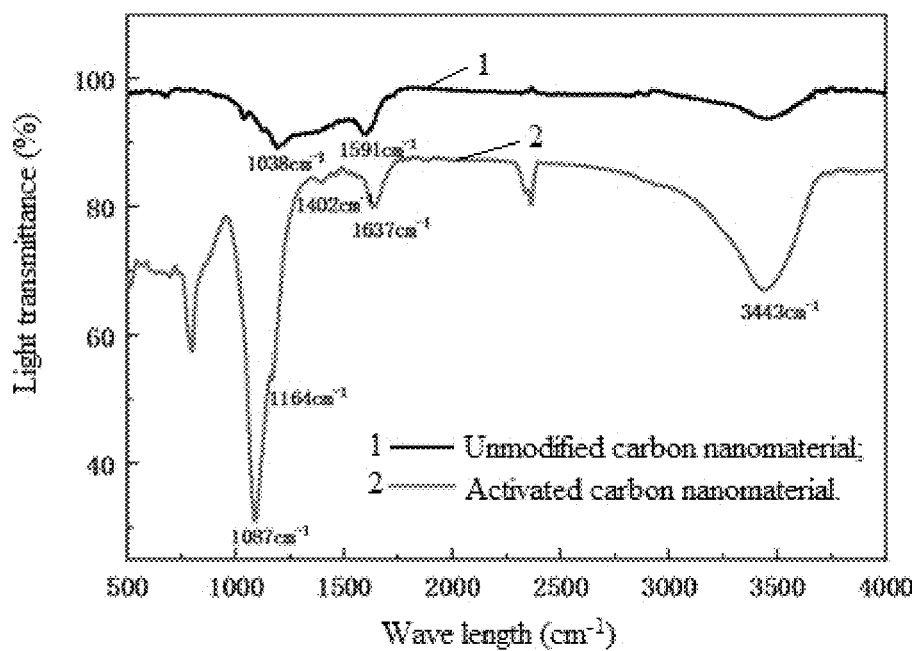
FIG. 3 illustrates a Fourier infrared curve chart of an activated carbon nanomaterial prepared in Example 7 of the present disclosure.

In addition, FIG. 3 illustrated an infrared curve chart of the activated carbon nanomaterial for ultra-low permeability oil reservoirs, as shown in FIG. 3, "1"—Unmodified carbon nanomaterial, "2"—Activated carbon nanomaterial; the active groups (namely tetradecyl hydroxypropyl sulfobetaine and hexadecyl hydroxypropyl sulfobetaine) of the surfactant can be successfully grafted on the multi-grafting site carbon nanomaterial, and the activated carbon nanomaterial for ultra-low permeability oil reservoirs with an interfacial activity was further formed.

Example 8

The example served to illustrate an activated carbon nanomaterial prepared with the method of the present disclosure.

An activated carbon nanomaterial for ultra-low permeability oil reservoirs was prepared with the same method as that in Example 7, except that the multi-grafting site carbon nanomaterial (with a particle size of 116 nm) prepared in Example 1 was replaced with the multi-grafting site carbon nanomaterial (with a particle size of 83 nm) prepared in Example 4.

The prepared activated carbon nanomaterial had a structural unit expressed by Formula (5), wherein each of the groups $R_5$-$R_9$ was structural unit expressed by Formula (6); the structural units represented by Formula (6) comprised two types: a type of group $R_{10}$ was tetradecyl, another type of group $R_{10}$ was hexadecyl.

Moreover, the prepared activated carbon nanomaterial for the ultra-low permeability oil reservoir and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was $3.81 \times 10^{-2}$ mN/m.

Example 9

The example served to illustrate an activated carbon nanomaterial prepared with the method of the present disclosure.

(F₄) 8.23 g of the multi-grafting site carbon nanomaterial (with a particle size of 95 nm) obtained in Example 3 was initially added into 82 g of toluene at room temperature (20° C.), the mixture was subjected to stirring under the conditions consisting of the stirring speed of 500 rpm for 12 min;

(F₅) 9.5 g of hexadecyl hydroxypropyl sulfobetaine was added while stirring, 0.27 g of catalyst dibutyltin dilaurate was further added, the mixture was subjected to stirring at 45° C. for 3 h to obtain a dispersion solution of active carbon nanomaterial for ultra-low permeability oil reservoirs.

(F₆) the obtained solution was subjected to washing with deionized water in sequence for 4 times, each washing was performed for 5 min; the solution was subsequently subjected to a centrifugation at a rotary speed of 11,000 rpm for 12 h; and rotary steaming at 85° C. for 5 h, and grinding and dispersing for 6 times, each grinding was performed for 14 min; the activated carbon nanomaterial for ultra-low permeability oil reservoirs was prepared, and the activated carbon nanomaterial had a structural unit expressed by Formula (5), wherein 40% of groups $R_5$-$R_9$ was H, and 60% of $R_5$-$R_9$ was structural unit expressed by Formula (6); wherein the group $R_{10}$ was hexadecyl. Moreover, the activated carbon nanomaterial and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was $8.76 \times 10^{-2}$ mN/m.

Example 10

The example served to illustrate an activated carbon nanomaterial prepared with the method of the present disclosure.

An activated carbon nanomaterial for ultra-low permeability oil reservoirs was prepared with the same method as that in Example 9, except that the multi-grafting site carbon nanomaterial (with a particle size of 95 nm) prepared in Example 3 was replaced with the multi-grafting site carbon nanomaterial (with a particle size of 83 nm) prepared in Example 4.

The prepared activated carbon nanomaterial had a structural unit expressed by Formula (5), wherein 20% of groups $R_5$-$R_9$ was H, and 80% of $R_5$-$R_9$ was structural unit expressed by Formula (6); wherein group $R_{10}$ was hexadecyl.

The prepared activated carbon nanomaterial for the ultra-low permeability oil reservoir and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was $6.55 \times 10^{-2}$ mN/m.

Example 11

The example served to illustrate an activated carbon nanomaterial prepared with the method of the present disclosure.

($F_4$) 14.68 g of the multi-grafting site carbon nanomaterial (with a particle size of 186 nm) obtained in Example 6 was initially added into 78 g of toluene at room temperature (20° C.), the mixture was subjected to stirring under the conditions consisting of the stirring speed of 600 rpm for 10 min;

($F_5$) 7 g of dodecyl hydroxypropyl sulfobetaine was added while stirring, 0.32 g of catalyst stannous octoate was further added, the mixture was subjected to stirring at 90° C. for 3 h to obtain a dispersion solution of active carbon nanomaterial for ultra-low permeability oil reservoirs.

($F_6$) the obtained solution was subjected to washing with deionized water in sequence for 4 times, each washing was performed for 4 min; the solution was subsequently subjected to a centrifugation at a rotary speed of 12,000 rpm for 14 h, and rotary steaming at 90° C. for 7 h, and grinding and dispersing for 7 times, each grinding was performed for 17 min; the activated carbon nanomaterial for ultra-low permeability oil reservoirs was prepared, and the activated carbon nanomaterial had a structural unit expressed by Formula (5), wherein 80% of groups $R_5$-$R_9$ was H, and 20% of $R_5$-$R_9$ was structural unit expressed by Formula (6), wherein the group $R_{10}$ was hexadecyl.

Moreover, the activated carbon nanomaterial and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was $9.7 \times 10^{-2}$ mN/m.

Example 12

The example served to illustrate an activated carbon nanomaterial prepared with the method of the present disclosure.

An activated carbon nanomaterial for ultra-low permeability oil reservoirs was prepared with the same method as that in Example 11, except that the multi-grafting site carbon nanomaterial (with a particle size of 186 nm) prepared in Example 6 was replaced with the multi-grafting site carbon nanomaterial (with a particle size of 83 nm) prepared in Example 4.

The prepared activated carbon nanomaterial had a structural unit expressed by Formula (5), wherein 20% of groups $R_5$-$R_9$ was H, and 80% of $R_5$-$R_9$ was structural unit expressed by Formula (6); wherein group $R_{10}$ was dodecyl. The prepared activated carbon nanomaterial for the ultra-low permeability oil reservoir and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was $6.8 \times 10^{-2}$ mN/m.

Comparative Example 1

The comparative example did not use a multi-grafting site carbon nanomaterial, but directly subjecting the oxidized carbon nanomaterial and an active agent to an esterification reaction.

(1) 13.2 g of oxidized carbon nanomaterial with a particle size of 140 nm was initially into 81 g of toluene at room temperature (20° C.), the mixture was subjected to stirring under the conditions consisting of the stirring speed of 400 rpm for 10 min;

(2) 3 g of tetradecyl hydroxypropyl sulfobetaine and 2.8 g of hexadecyl hydroxypropyl sulfobetaine were added while stirring, 0.32 g of catalyst dibutyltin dilaurate was further added, the mixture was subjected to stirring at 40° C. for 2 h to obtain a dispersion solution of active carbon nanomaterial for ultra-low permeability oil reservoirs.

(3) the obtained solution was subjected to washing with deionized water in sequence for 3 times, each washing was performed for 4 min; the solution was subsequently subjected to a centrifugation at a rotary speed of 10,000 rpm for 10 h; and rotary steaming at 80° C. for 4 h, and grinding and dispersing for 5 times, each grinding was performed for 12 min; the activated carbon nanomaterial for ultra-low permeability oil reservoirs was prepared.

The activated carbon nanomaterial had a structural unit expressed by Formula (5), wherein 80% of groups $R_5$-$R_9$ was H, and 20% of $R_5$-$R_9$ was structural unit expressed by Formula (6); wherein the group $R_{10}$ was tetradecyl.

Moreover, the activated carbon nanomaterial and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was 1.7 mN/m.

Comparative Example 2

The activated carbon nanomaterial was prepared with the same method as that in Example 7, except that the active agents "tetradecyl hydroxypropyl sulfobetaine and hexadecyl hydroxypropyl sulfobetaine" were replaced with "lauramidopropyl hydroxysultaine".

The activated carbon nanomaterial had a structural unit expressed by Formula (5), wherein 60% of groups $R_5$-$R_9$ was H, and 40% of $R_5$-$R_9$ was structural unit expressed by Formula (6); wherein the group $R_{10}$ was lauramide group.

Moreover, the activated carbon nanomaterial and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was 5.2 mN/m.

Comparative Example 3

The activated carbon nanomaterial was prepared with the same method as that in Example 7, except that the preparation of the multi-grafting site carbon nanomaterial was performed with the same method as that of the Example 4, and the grafting agent "diphenylmethane diisocyanate" was replaced with "monoisocyanate", the prepared multi-grafting site carbon nanomaterial had a structural unit expressed by Formula (5), wherein 60% of groups $R_5$-$R_9$ was H, and 40% of $R_5$-$R_9$ was structural unit expressed by Formula (6);

in addition, the structural units represented by Formula (6) comprised two types: a type of group $R_{10}$ was tetradecyl, another type of group $R_{10}$ was hexadecyl.

Moreover, the activated carbon nanomaterial and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was 1.9 mN/m.

Comparative Example 4

The activated carbon nanomaterial was prepared with the same method as that in Example 7, except that:

(F4) 8 g of the multi-grafting site carbon nanomaterial (with a particle size of 116 nm) obtained in Example 1 was initially added into 81.7 g of toluene at room temperature (25° C.), the mixture was subjected to stirring under the conditions consisting of the stirring speed of 250 rpm for 5 min;

(F5) 5 g of tetradecyl hydroxypropyl sulfobetaine and 5 g of hexadecyl hydroxypropyl sulfobetaine were added while stirring, 0.3 g of catalyst dibutyltin dilaurate was further added, the mixture was subjected to stirring at 20° C. for 0.5 h to obtain a dispersion solution of active carbon nanomaterial for ultra-low permeability oil reservoirs.

The activated carbon nanomaterial had a structural unit expressed by Formula (5), wherein 80% of groups $R_5$-$R_9$ was H, and 20% of $R_5$-$R_9$ was structural unit expressed by Formula (6); in addition, the structural units represented by Formula (6) comprised two types: a type of group $R_{10}$ was tetradecyl, another type of group $R_{10}$ was hexadecyl.

Moreover, the activated carbon nanomaterial and water were used under the temperature condition of 90° C. to prepare a displacement system of activated carbon nanomaterial for ultra-low permeability oil reservoirs; as a result, the displacement system with a concentration of 0.2 wt % can reduce the oil-water interfacial tension, the oil-water interfacial tension was 7.2 mN/m.

Application Example

The displacement systems of activated carbon nanomaterial for ultra-low permeability oil reservoirs prepared in Examples 7-12 and the Comparative Examples 1~4 were applied in the tests of the ultra-low permeability oil reservoirs for improving oil recovery, the viscosity of simulated oil used in the test was 4.6 mPa·s at 90° C., the simulated water mineralization degree of the stratum was 10,000 mg/L, the experimental temperature was 90° C., the basic parameters of the rock core were as follows: length×diameter=10 cm×2.5 cm; the core was vacuumized to remove saturated water and saturated oil at 90° C., and subjected to water flooding to 98%, the activated carbon nanomaterial oil displacement system with a concentration of 0.2% was injected, the injection amount was 30% of the pore volume of the core, the recovery ratio increment of the displacement with an injection system and the subsequent water flooding was measured, the results were shown in Table 1.

TABLE 1

| Items | Recovery ratio of the displacement with an injection system/% | Recovery ratio of the subsequent water flooding/% |
| --- | --- | --- |
| Example 7 | 17.35 | 16.82 |
| Example 8 | 18.69 | 18.34 |
| Example 9 | 16.73 | 15.49 |
| Example 10 | 17.24 | 16.38 |
| Example 11 | 16.29 | 15.47 |
| Example 12 | 17.08 | 15.76 |
| Comparative Example 1 | 7.63 | 6.85 |
| Comparative Example 2 | 6.04 | 5.32 |
| Comparative Example 3 | 7.25 | 6.32 |
| Comparative Example 4 | 5.17 | 5.42 |

As can be seen from the results in Table 1, the Examples 7-12 of the present disclosure have desirable effect of increasing the recovery efficiency, the sum of the recovery ratio of the displacement with an injection system and the recovery ratio of the subsequent water flooding for each of Examples 7-12 is more than 30%, which is obviously better than that of the Comparative Examples 1-4.

The multi-grafting site carbon nanomaterial is not used in the Comparative Example 1, given that the carboxyl on the surface of the oxidized carbon nanomaterial has low reactivity, so that carboxyl cannot completely perform an esterification reaction with hydroxyl in the active agent, the content of active group on the surface of the activated carbon nanomaterial is low, thus the result is undesirable.

The Comparative Example 2 uses lauramidopropyl hydroxysultaine as an active agent, but the lauramidopropyl hydroxysultaine has a limited capability of reducing the oil-water interfacial tension, such that the activated carbon nanomaterial has a decreased capability of reducing the oil-water interfacial tension, thus the result is undesirable.

The Comparative Example 3 uses monoisocyanate as the grafting agent, because the reactivity of the activated carboxyl group of monoisocyanate is not as strong as that of diisocyanate, it causes a reduced content of active groups on the surface of the activated carbon nanomaterial in the subsequent reaction, thus the result is undesirable.

The stirring conditions and the reaction conditions in the Comparative Example 4 are not defined within the ranges defined in the present disclosure, the grafting reaction and the activation reaction are not sufficiently performed, resulting in a low content of active groups on the surface of the activated carbon nanomaterial, thus the result is undesirable.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A multi-grafting site carbon nanomaterial comprising a structural unit represented by Formula (1):

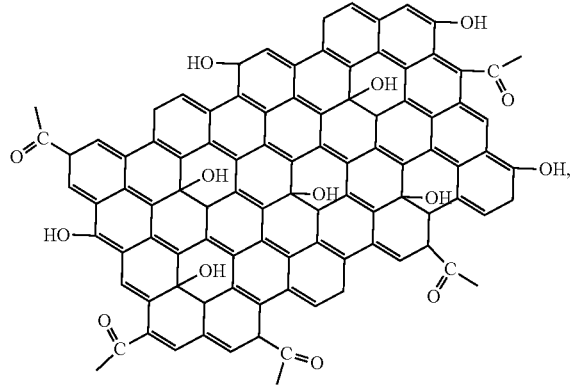

Formula (1);
  hydroxyl groups; and
  a structural unit represented by Formula (2):

Formula (2);
  wherein R is one or more selected from the group consisting of tolyl, diphenylmethyl, isophorone group and dicyclohexylmethyl.

2. The multi-grafting site carbon nanomaterial of claim 1, wherein an acyl side chain of the structural unit represented by Formula (1) is grafted with a hydroxyl group and/or the structural unit represented by Formula (2), and the grafting ratio of the structural unit represented by Formula (2) is within a range of 20-100%, based on the total content of the acyl side chains of the structural unit represented by Formula (1).

3. A method for preparing the multi-grafting site carbon nanomaterial of claim 1 including:
  ($F_1$) dispersing an oxidized carbon nanomaterial in a first organic solvent to obtain a dispersion liquid;
  ($F_2$) contacting the dispersion liquid with a grafting agent to carry out a grafting reaction;
  ($F_3$) subjecting the solution obtained after the step ($F_2$) to a centrifugation, rotary steaming and grinding treatment to prepare the multi-grafting site carbon nanomaterial;
  wherein the oxidized carbon nanomaterial has a structure represented by Formula (3):

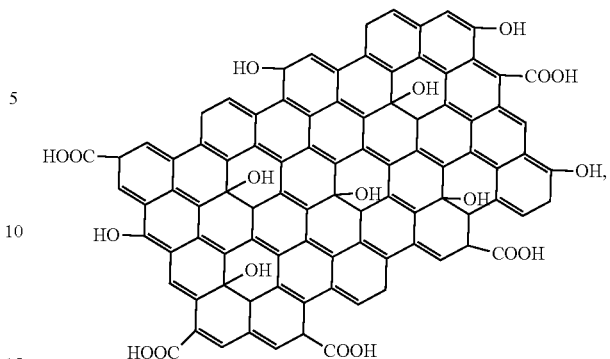

Formula (3);
  wherein the grafting agent is one or more selected from the group consisting of toluene diisocyanate, diphenylmethane diisocyanate, isophorone diisocyanate and dicyclohexylmethane diisocyanate.

4. The method of claim 3, wherein the first organic solvent is one or more selected from the group consisting of toluene, xylene and dichloromethane.

5. The method of claim 3, wherein the conditions of grafting reaction in step ($F_2$) comprise: the stirring speed is 200-1,000 rpm, the reaction temperature is 60-100° C., and the reaction time is 1-10 h.

6. The method of claim 3, wherein the weight ratio of the amount of the oxidized carbon nanomaterial to the first organic solvent is (6-20): 100.

7. The method of claim 3, wherein the weight ratio of the amount of the grafting agent to the first organic solvent is (0.6-2): 100.

8. A method for preparing an activated carbon nanomaterial comprising:
  ($F_4$) dispersing the multi-grafting site carbon nanomaterial of claim 1 in a second organic solvent to obtain a dispersion liquid;
  ($F_5$) contacting the dispersion liquid with an active agent in the presence of a catalyst to carry out an activation reaction;
  ($F_6$) subjecting the solution obtained after the step ($F_5$) to a centrifugation, washing, rotary steaming and grinding treatment to prepare an activated carbon nanomaterial;
  wherein the active agent has a structure represented by Formula (4):

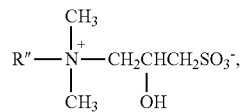

Formula (4);
  wherein R" is one or more selected from the group consisting of dodecyl, tetradecyl, hexadecyl and octadecyl.

9. The method of claim 8, wherein R" is tetradecyl and/or hexadecyl.

10. The method of claim 8, wherein the catalyst is one or more selected from the group consisting of dibutyltin dilaurate, stannous octoate and dibutyl tin maleate.

11. The method of claim 8, wherein the second organic solvent is selected from toluene and/or xylene and dichloromethane.

12. The method of claim 8, wherein the conditions of the activation reaction in step ($F_5$) comprise: the stirring speed is 200-1,000 rpm, the reaction temperature is 25-80° C., and the reaction time is 1-6 h.

13. The method of claim 8, wherein the weight ratio of the amount of the multi-grafting site carbon nanomaterial to the second organic solvent is (8-22): 100.

14. The method of claim 8, wherein the weight ratio of the amount of the active agent to the second organic solvent is (4-20): 100.

15. The method of claim 8, wherein the weight ratio of the amount of the catalyst to the second organic solvent is (0.01-0.5): 100.

16. An activated carbon nanomaterial prepared by the method of claim 8, wherein the activated carbon nanomaterial has a structure represented by Formula (5):

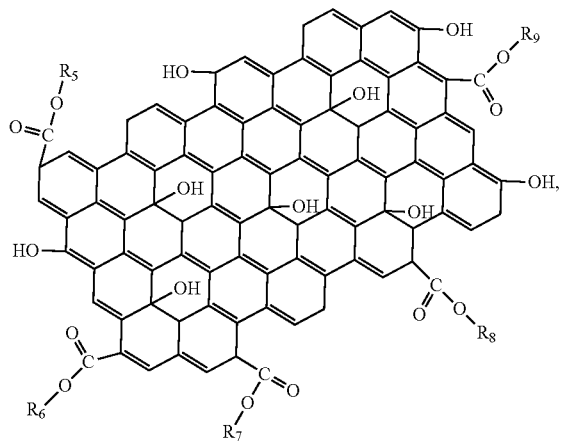

Formula (5);

wherein $R_5$, $R_6$, $R_7$, $R_8$ and $R_9$ are the same or different, each is H or a structural unit represented by Formula (6), and the proportion of the structural unit represented by Formula (6) is 20-100%, based on the total content of the numbers of $R_5$, $R_6$, $R_7$, $R_8$ and $R_9$ at the ester group side chains of the structure represented by Formula (5);

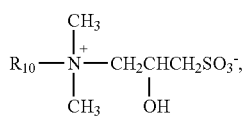

Formula (6);

wherein, $R_{10}$ is one or more selected from the group consisting of dodecyl, tetradecyl, hexadecyl and octadecyl.

17. The activated carbon nanomaterial of claim 16, wherein each of $R_5$, $R_6$, $R_7$, $R_8$ and $R_9$ is a structural unit represented by Formula (6).

18. The activated carbon nanomaterial of claim 16, wherein the activated carbon nanomaterial has an average particle size within a range of 70-200 nm.

19. A displacement system for ultra-low permeability oil reservoirs comprising the activated carbon nanomaterial of claim 16.

* * * * *